Figure 1A:
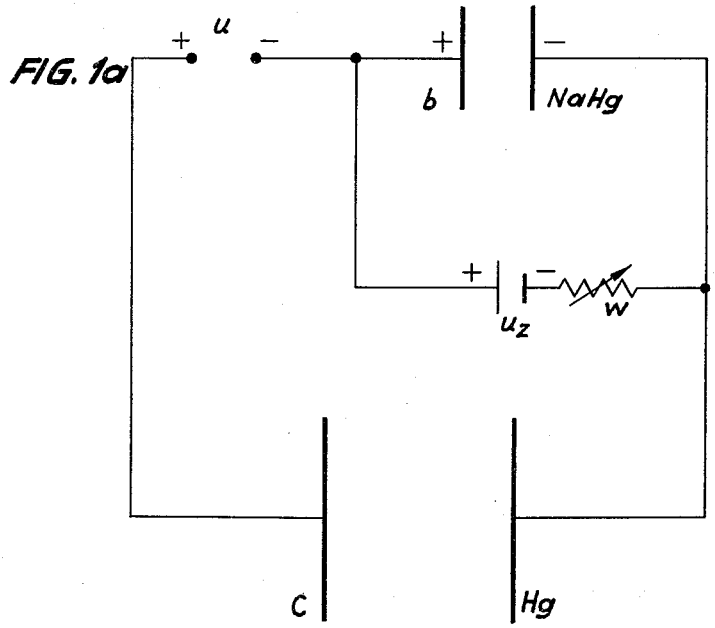

United States Patent Office 3,068,157
Patented Dec. 11, 1962

3,068,157
PROCESS FOR USING THE DECOMPOSITION ENERGY OF AMALGAMS FOR ELECTROLYSIS OF METAL SALTS BY USING REVERSIBLE HYDROGEN ELECTRODES
Wolf Vielstich, Bonn, and Eduard Justi and August Winsel, Braunschweig, Germany, assignors, by mesne assignments to Accumulatoren-Fabrik Aktiengesellschaft, Frankfurt am Main, Germany, and Siemens-Schuckert-Werke Aktiengesellschaft, Erlangen, Germany, both German corporations
Filed Dec. 15, 1959, Ser. No. 859,710
Claims priority, application Germany Dec. 22, 1958
18 Claims. (Cl. 204—99)

The present invention relates to a process and arrangement of electrolytic cells for the more efficient electrolysis of aqueous solutions of alkali metal chloride.

In industrial plants for the electrolysis of alkali metal chlorides, conventional cells of the mercury-cathode type are generally used. Alkali metal chloride is decomposed in one cell compartment, and thereafter the alkali metal amalgam formed at the cathode flows to a secondary cell, to which water is fed. In a hitherto known process, the alkali metal amalgam in the secondary cell takes the form of the anode with respect to a subsidiary electrode arranged in said secondary cell, which acts as cathode. The alkali metal amalgam is decomposed therein with the production of alkali metal hydroxide and hydrogen. In this secondary cell or decomposer cell, iron or graphite was heretofore used as the cathode at which hydrogen was evolved. The secondary cell in such arrangements is connected in series with the electrolyzer cell, thereby regenerating part of the electrical energy required for the electrolysis.

This process (see "Castner Zelle," Ullmann, Encyklopädie der technischen chemie, 1954, Bd. 5, page 347), suffers from the fundamental disadvantage, nevertheless that, due to the high $H_2$-overvoltage and polarization of the said electrodes current densities of 1000–2000 a./m.$^2$ normally used in practical operation, only a small saving in energy is possible.

Kandler and Voigt have proposed the use of a hydrogen electrode with smaller hydrogen overvoltage and polarization as counter electrode to the alkali amalgam to increase thereby the gain of energy. With a sintered nickel electrode (as used for Ni-accumulators) a gain of voltage of 0.5 volt was obtained in this way.

If it is intended to use the energy of amalgam decomposition for the alkali chloride electrolysis the electrolyzer cell and amalgam decomposer cell must be connected in series. Through such connection, however, the current yield in the decomposer cell is smaller than in the electrolyzer cell, since part of the amalgam in the decomposer cell is chemically decomposed without generation of current. Consequently, a higher rate of current must flow through the eletrolyzer cell than through the decomposer cell.

In order to adjust the current rate of the decomposer cell to that of the electrolyzer cell, Castner proposed to arrange a resistance in shunt connection with the decomposer cell. As long as the decomposer cell operates as a galvanic cell, this connection results in an increase in amperage instead of a decrease therein.

Kandler and Voigt have proposed the arrangement of an additional anode in the electrolyzer cell. In this case, the mercury in the electrolyzer cell and the amalgam in the decomposer cell must be insulated from each other. Moreover, the additional electrode only operates with the terminal voltage and therefore must possess an appropriate surface area.

In every case the required expense for the adjustment of known alkali-chlorine cells, in view of the necessary supply of current, arrangement of additional electrodes and additional power sources, has to be counter-balanced by the expected gain in voltage for the operation to be run efficiently. From a practical operating standpoint therefore, the galvanic voltage produced by the decomposition of the amalgam in the decomposer cell of alkali-chlorine plants for favorable commercial utilization should be as high as possible.

Conventional electrodes used for evolution of hydrogen consisting of iron or nickel sheet material, as applied in known electrolyzer cells, especially water electrolyzer cells, as well as accumulator electrodes of sintered nickel mentioned above, were found unsuitable for realizing this desired high galvanic voltage, since their potentials differed too much from the reversible hydrogen potential. Even in the case of electrodes of sintered nickel or other known electrodes, roughened by superficially alloying the electrode body and leaching out the alloying element (as described in German Patent 592,130), this potential difference amounts up to 200 mv.

It is an object of the present invention, therefore, to overcome the foregoing drawbacks and to realize an optimal galvanic voltage in the electrolysis by using an electrode in the decomposer cell whose potential under the electrolysis conditions selected approaches as far as possible the reversible hydrogen potential.

It is a further object of the invention, to compensate for the current loss due to chemical decomposition of the amalgam by an appropriate connection of an additional source of voltage, so that a gain in energy of 15 to 20% is obtained by electro-chemical decomposition of the amalgam.

Figure 1B:
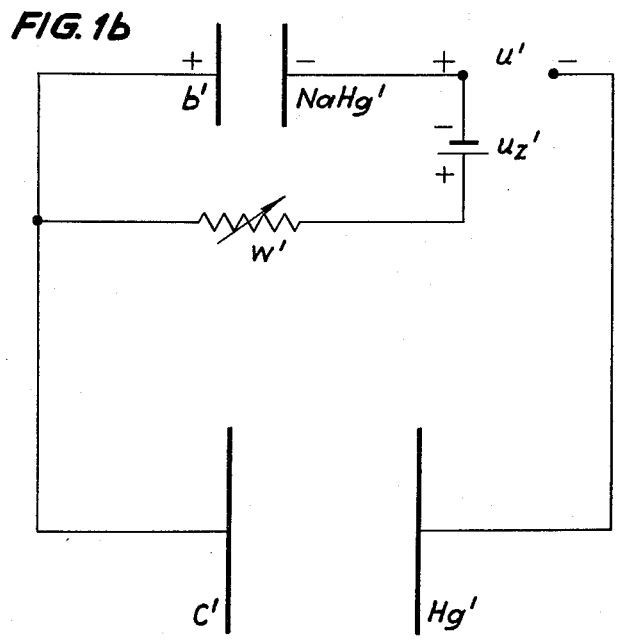
Figure 2:
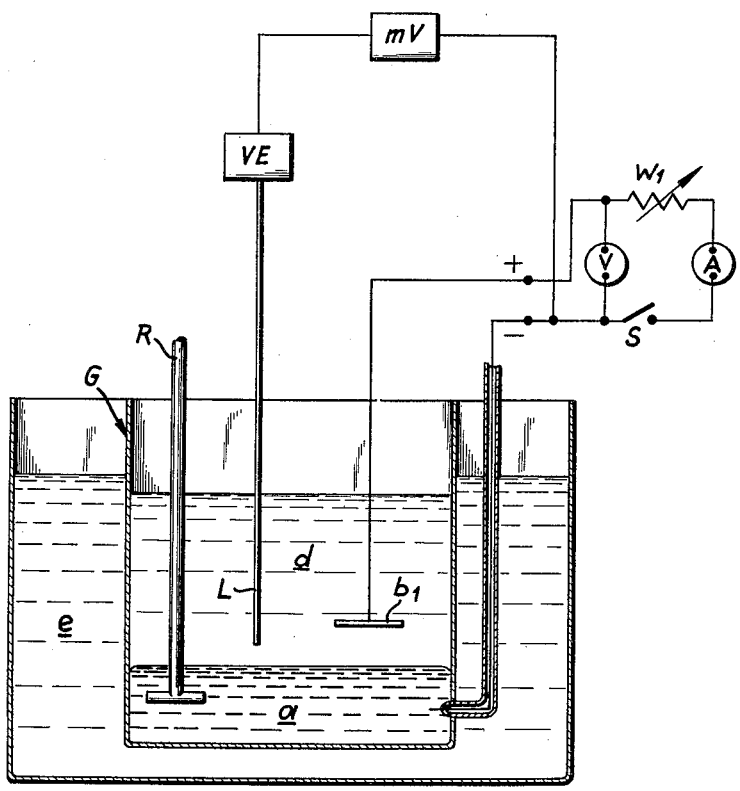

Other and further objects will be apparent from a study of the within specification and drawings, in which:

FIGS. 1a and 1b are schematic views of embodiments of electrolysis circuits which may be used in accordance with the invention, and FIG. 2 is a schematic view of a further electrolysis circuit.

It has been found in accordance with the invention that the foregoing drawbacks may be overcome and an efficient electrolysis may be carried out using the decomposition energy of amalgam in a decomposer cell for the electrolysis of metal salts such as alkali metal choride in an electrolyzer cell, by providing in addition to the amalgam in the decomposer cell a double skeleton catalyst electrode as hydrogen evolution electrode including a carrier skeleton with catalyst metal granules embedded therein. In this way, a partial source of the energy required for electrolysis of said metal salts in said electrolyzer cell is effectively generated, the current in the amalgam decomposer cell being adjusted to that required in the electrolyzer cell by means of an additional voltage source.

The double skeleton catalyst electrode may be prepared from a mixture of (1) a powdered sinterable carrier skeleton material having good electrical conductivity and not being appreciably attacked by caustic alkali, such as iron or nickel, especially carbonyl nickel, cobalt, carbon and alloys containing at least one of these components, with (2) a powdered alloy such as a Raney alloy of a metal of the iron group such as nickel, cobalt, iron, with an alloying metal such as aluminum, zinc, magnesium and mixtures thereof.

The powdered mixture is pressed and sintered to fuse the particles together at the points of contact and leached with a caustic alkali solution to dissolve out at least a part of the alloying metal. A double skeleton catalyst electrode is thus produced which includes a carrier skeleton in the interspaces of which a catalytic substance such as Raney metal in the form of a catalyst skeleton is arranged. The alloy may be for example a nickel-aluminum Raney alloy which upon leaching results in a catalyst skeleton of Raney nickel.

A Raney alloy is understood to be any alloy having at least two components, the active component of which after dissolving out the inactive component, exhibits a catalytic effect.

Generally, the carrier substance is used in the form of a powder having an average particle diameter of not more than $50\mu$–$100\mu$ while the Raney alloy is used in the form of a powder having an average particle diameter of not more than $60\mu$–$100\mu$. The pressing may be carried out under pressures of for example 3000–7000 atm./cm.$^2$ and the sintering may be carried out at temperatures of for example 500–1000° C. The leaching may be accomplished for example with 6-normal alkali solution.

A double skeleton catalyst electrode is thus formed having a carrier skeleton in the form of a porous structure of a sintered powder of carbon and/or metals capable of forming a sinterable mixture with powdered Raney alloy, said porous structure containing distributed therein Raney catalyst skeleton granules fused at the points of contact thereto.

For producing the double skeleton structure, in general 10 to 90% by weight and preferably 35 to 65% by weight of carrier material and 90 to 10% by weight, and preferably 65 to 35% by weight of the alloy are used.

The alloy may include in general 20 to 80% by weight, and preferably 40 to 60% by weight of at least one metal of the iron group, especially nickel and 80 to 20% by weight, preferably 60 to 40% by weight of aluminum and/or zinc and/or magnesium.

The efficiency of the electrode may be still further increased, if 1 to 20% by weight, and preferably up to 10% by weight (related to the weight of the metal of the said iron group) of at least one further metal of Group VIIIa of Mendeléeff's Periodic Table, especially Pt, Pd, Ir, Ru are added in mixture therewith to the alloy. These metals remain in the metal of the iron group, when the alloying metal is dissolved.

Besides the said metals of Group VIIIa, a small amount of magnesium oxide may be added to the alloy. It is in general sufficient, to add 0.5 to 20% by weight, preferably 3 to 10% by weight MgO, related to the metal of the iron group. In this way, the recrystallization of the metal of the iron group is suppressed.

Electrodes, which are in part or superficially provided with an alloy of a metal of the iron group with an alloying element, which may be dissolved, are known (see German Patent 592,130). At high electrolysis temperatures of 80–100° C. their activity decreases. This is probably due to recrystallization of the metal of the iron group. However, with respect to the electrodes used in accordance with the invention, this recrystallization may be prevented by the presence of MgO. The latter compound in this connection does not impair the usefulness of the electrodes in contact with mercury and amalgam and thus affords a versatile constituent rendering advantageous effects without deleterious side actions.

It is in general sufficient to supply a superficial layer of the double skeleton catalyst material to a solid or porous metallic base, for instance a metal foil or a metal gauze. This layer preferably has a thickness of 0.2 to 0.4 mm. In such case the starting materials for the double skeleton layer are applied to the metallic base and anchored thereon by pressing or sintering. Thereafter the composite member is treated with an alkaline reacting solution especially caustic alkali to dissolve out the soluble component of the alloy.

A further method comprises applying the comminuted starting material to a substrate as for example a multi-layered metal gauze or a plate of metal fibers in such manner, that it fills the pores of the said substrate, and thereafter pressing, sintering and at least partly dissolving out the soluble component of the alloy with an alkaline reacting solution, especially caustic alkali.

As carrier skeleton for the double skeleton material to be used in accordance with the invention, there may be conveniently used the same metal that is used as the active component of the said alloy with aluminum zinc, magnesium or another metal, such as for instance cheap iron.

In no load condition, the electrodes used according to the invention, adjust to the reversible hydrogen potential, i.e. $-0.8$ to $-0.9$ v. in relation to the normal hydrogen electrode (depening on the alkali hydroxide content of the solution in the decomposer cell). This means that these electrodes possess no overvoltage, as their potential is about 0.9 v. more positive than the potential of the amalgam electrode ($-1.74$ v. in relation to the amalgan electrode, see Ullmann, vol. 5, page 331). At current densities of 1000 to 2000 a./m.$^2$, the polarization of those electrodes remarkably amounts only to 0.02 to 0.06 v., depending on the electrode material, temperature and concentration of the alkali hydroxide solution. Thus, due to the use of the electrodes according to the invention, the energy generated by amalgam decomposition in the decomposer cell approaches the theoretical value except for the 0.02 to 0.06 volt polarization mentioned above.

By using the above mentioned electrodes according to the invention, twice the energy is advantageously gained as that possible with hitherto used electrodes. However, the net gain obtained by the process of the invention is even higher, since nearly the same amount has to be taken into consideration for the required additional expense in each case although the present invention affords a much higher energy effect.

By using the above named electrodes, the decomposer cell advantageously acts as a galvanic cell even at current densities above 5000 a./m.$^2$. A high current density is of importance for preventing energy loss by chemical decomposition of the amalgam, since the chemical decomposition decreases with increasing current density.

If it is intended to use the decomposition energy of the alkali amalgam for alkali chloride electrolysis, additional amalgam must be produced nevertheless since the inevitable current loss due to chemical decomposition of the latter, which amounts to about 5% must still be balanced.

This is possible with an arrangement in accordance with the invention including in addition to the electrolyzer cell a decomposer cell, wherein the amalgam becomes the anode to a hydrogen evolution electrode and wherein the rate of current is adjusted to that of the primary cell with an additional source of voltage. The said hydrogen evolution electrode comprises double skeleton catalyst material as aforesaid. The current loss due to self decomposition of the alkali metal amalgam is compensated for by connecting the additional source of voltage in parallel with the primary cell (electrolyzer) or with the decomposer cell.

This may be accomplished for instance by means of the cricuit connections shown in FIG. 1a. In this arrangement, a carbon anode C is provided and mercury (Hg) is used as the cathode. Alkali metal chloride solution for example sodium chloride solution may be disposed within the electrolyzer cell. An external source of voltage U and the amalgam decomposer cell (NaHg, $b$) connected in series therewith supply the voltage for the electrolyzer cell (C, Hg). The decomposer cell contains amalgam (NaHg) as the anode and a double skeleton catalyst electrode $b$ as afore-described as the cathode.

Alkali metal hydroxide such as sodium hydroxide produced in the decomposer cell acts as the electrolyte.

The mercury cathode of the electrolyzer cell is in conductive connection with the amalgam anode of the decomposer cell. An additional source of voltage $U_z$ and also a variable resistance W are placed in shunt connection parallel to the decomposer cell (NaHg, b). Current and voltage in the shunt connection are adjusted in such manner, that the chemical decomposition of the amalgam is compensated for by passing a corresponding portion of the current through the shunt connection.

Another device is shown in FIG. 1b. In this case, the mercury cathode (Hg′) of the electrolyzer cell and the amalgam anode (NaHg′) of the decomposer cell are insulated from each other. The shunt connection and decomposer cell(NaHg′, b′) are provided between the positive pole of the external source of voltage U′ and the anode C′ of the electrolyzer cell. An additional source of voltage $U_z'$ and also a variable resistance W′ are provided in the shunt connection.

The mercury, leaving the decomposer cell after decomposition may be freed of last traces of amalgam in a conventional decomposing device, so that it is fully regenerated before being recirculated to the electrolyzer.

The invention may be further illustrated by the following example set forth by way of illustration and not limitation.

Example 1

An electrode with an area of 12 cm.² was prepared in the following manner. An iron foil of 0.12 mm. thickness was etched by treating with concentrated hydrochloric acid. Three gms. of a pulverulent mixture comprising a magnesium oxide-containing nickel-aluminum alloy (catalyst containing component) and pure nickel (carrier component in the weight ratio of 1:1.5 (both powder having a particle size of 75 to 100μ) was applied to this foil, equally distributed thereon and compacted by pressing with a pressure of 50 tons at a temperature of 400 to 420° C. for about 15 minutes. The alloy comprised 48 parts by weight of nickel, 4 parts by weight of magnesium oxide and 48 parts by weight of aluminum. The so applied superficial layer of about 0.25 mm. thickness was tightly bonded to the metallic substrate (iron foil). It was not loosened after leaching during continued use in accordance with the invention in the amalgam cell.

The scheme of the experimental device used is shown in FIG. 2. Since a cell with an amalgam electrode and a hydrogen evolution electrode acts as primary galvanic cell, no external source of voltage is afforded in this case.

The electrolyzer cell, vessel G contains in the bottom part the amalgam electrode a which contains 0.1 to 0.2% by weight sodium. An electrode $b_1$ consisting of or containing double skeleton catalyst material derived from a metal of the iron group such as that prepared in Example 1 is mounted above the amalgam a at a distance of about 1 cm. therefrom. It is surrounded by the electrolyte solution d, which contains about 7 to 8% by weight NaOH. The stirrer R provides for rapid equalization of the amalgam concentration. The liquid e of the surrounding thermostat was kept at 70° C.

The potential of the amalgam was controlled by means of a voltmeter (mv.) over the Luggin capillary L in comparison with a standard saturated calomel electrode VE. (The Luggin capillary is a syphon with capillary opening, containing an electroylte solution. With the aid of this Luggin capillary, the hydrogen evolution electrode is connected with the said calomel electrode to a galvanic element, whose electromotive force is measured. See, G. Milazzo, Elektrochemie, Springer-Verlag, Wien, 1952, page 130.) Voltmeter V indicated the terminal voltage, ammeter A the flowing current. The circuit was closed by switchgear S and the flowing current regulated by resistance $W_1$. In comparison to the double skeleton catalyst electrode an electrode consisting of a conventional nickel foil was measured. The measuring data are shown in the following table.

| A. | A./m.²* | mv. (Na-Hg) | Terminal voltage, mv. | |
|---|---|---|---|---|
| | | | Nickel foil | Electrode according to the invention |
| 0 | 0 | 2,060 | 830 | 950 |
| 0.05 | 42 | ---------- | 690 | 942 |
| 0.2 | 167 | 2,050 | 570 | 920 |
| 0.4 | 335 | 2,040 | 470 | 885 |
| 0.8 | 666 | 2,010 | 270 | 810 |
| 1.2 | 1,000 | 1,990 | 60 | 745 |
| 1.6 | 1,333 | 1,690 | ---------- | 675 |
| 2.0 | 1,665 | 1,935 | ---------- | 605 |

*In relation to the hydrogen evolution electrode.

Thus, it is seen that the energy generated when using the arrangement in accordance with the invention including a double skeleton catalyst electrode is by far significantly greater than that obtained using other conventional electrodes in such an arrangement. Accordingly, this new use of double skeleton catalyst electrodes in decomposer cells as hydrogen evolution cathode to afford a greater part of the energy required for electrolysis of metal salts such as alkali metal chloride in an electrolyzer cell as a result of amalgam decomposition in a decomposer cell is a surprising and industrially valuable discovery.

What is claimed is:

1. Process which comprises carrying out the electrolysis of alkali metal chloride in an electrolyzer cell using the energy of decomposition of amalgam in a decomposer cell having an amalgam electrode and a hydrogen evolution electrode of double skeleton catalyst material including a carrier skeleton with catalyst metal granules embedded therein as a partial source of the energy required for electrolysis of said metal salts in such electrolyzer cell, while adjusting the current in the amalgam decomposer cell to that required in the electrolyzer cell by means of an additional voltage source.

2. Process according to claim 1 wherein said double skeleton catalyst electrode includes a pressed and sintered mixture of a powdered carrier material with a powdered alloy of a metal of the iron group and an alloying metal, subsequently leached to dissolve at least a portion of the alloying metal therefrom.

3. Process according to claim 2 wherein said carrier material contains at least one member selected from the group consisting of iron, cobalt, nickel, carbonyl nickel, carbon, and mixtures thereof, said alloy includes at least one member selected from the group consisting of iron, cobalt, nickel and an alloying metal selected from the group consisting of aluminum, zinc and magnesium, said alloying metal being leached by caustic alkali action.

4. Process according to claim 2 wherein said double skeleton catalyst electrode includes from 10–90% by weight of carrier metal and 90–10% by weight of the alloy.

5. Process according to claim 2 wherein said double skeleton catalyst electrode includes from 35–65% by weight of carrier metal and 65–35% by weight of the alloy.

6. Process according to claim 2 wherein said alloy includes from 20–80% by weight of a metal of the iron group and 80–20% by weight of a member selected from the group consisting of aluminum, zinc and magnesium.

7. Process according to claim 2, wherein said alloy includes from 40–60% by weight of a metal of the iron group and 60–40% by weight of a member selected from the group consisting of aluminum, zinc, and magnesium.

8. Process according to claim 6 wherein said alloy additionally contains 1–20% of a further metal of group VIIIa of the Mendeléeff Periodic Table.

9. Process according to claim 8 wherein said further metal is selected from the group consisting of platinum, palladium, iridium, and ruthenium, and is present in an amount up to 10% by weight.

10. Process according to claim 6 wherein said alloy additionally contains from 0.5 to 20% by weight of magnesium oxide.

11. Process according to claim 2 wherein said double skeleton catalyst material is present as a thin layer upon a metallic substrate.

12. In the process for the electrolysis of alkali metal chlorides in an electrolyzer cell using the energy of decomposition of amalgam in a decomposition cell having an amalgam electrode and a hydrogen evolution electrode as a partial source of the energy required, the adjustment of the current in the amalgam decomposer cell to that in the electrolyzer cell being carried out with the aid of an additional source of voltage, the improvement which comprises carrying out said process using as hydrogen evolution electrode a double skeleton catalyst electrode having a carrier skeleton with catalyst metal granules embedded therein while adjusting the current in the amalgam decomposer cell to that required in the electrolyzer cell by means of an additional voltage source.

13. An arrangement for carrying out the electrolysis of alkali metal chlorides in an electrolyte in an electrolyzer cell which comprises an electrolyzer cell, means for supplying energy thereto including an external main voltage source, a decomposer cell having an amalgam electrode and a hydrogen evolution electrode of double skeleton catalyst material including a carrier skeleton with catalyst metal granules embedded therein, means for supplying the energy generated in the decomposer cell to the electrolyzer cell and means including an additional voltage source for adjusting the current in the decomposer cell to that required in the electrolyzer cell.

14. An arrangement according to claim 13 wherein said means for supplying the energy generated in the decomposer cell and said means for adjusting the current required are arranged in parallel with respect to one another in the circuit of the electrolyzer cell.

15. An arrangement according to claim 13 wherein the negative pole of the external main voltage source is connected to the cathode of the electrolyzer cell through said additional source of voltage and a variable resistance in series circuit therewith.

16. An arrangement according to claim 13 wherein the negative pole of said additional source of voltage is connected to the positive pole of the external main voltage source and the positive pole of said additional source of voltage is connected to the anode of the electrolyzer cell through a variable resistance in series circuit therewith.

17. An arrangement according to claim 13 wherein said double skeleton catalyst electrode includes from 10–90% by weight of carrier metal and 90–10% by weight of the alloy.

18. An arrangement according to claim 13 wherein said alloy includes from 20–80% by weight of a metal of the iron group and 80–20% by weight of a member selected from the group consisting of aluminum, zinc, and magnesium.

References Cited in the file of this patent

UNITED STATES PATENTS

| | | |
|---|---|---|
| 307,461 | Hinkley | Nov. 4, 1884 |
| 631,468 | Kellner | Aug. 22, 1899 |
| 699,414 | Reed | May 6, 1902 |
| 809,089 | Blackmore | Jan. 2, 1906 |
| 2,597,545 | Taylor | May 20, 1952 |
| 2,928,891 | Justi et al. | Mar. 15, 1960 |

FOREIGN PATENTS

| | | |
|---|---|---|
| 592,130 | Germany | Feb. 1, 1934 |